June 20, 1933.  O. O. STORLE  1,914,792

ONE-SLEEVE COMBUSTION ENGINE

Filed March 2, 1929

Ole O. Storle, Inventor

By Geo. W. Bullard, Attorney

Patented June 20, 1933

1,914,792

UNITED STATES PATENT OFFICE

OLE O. STORLE, OF TACOMA, WASHINGTON

ONE SLEEVE COMBUSTION ENGINE

Application filed March 2, 1929. Serial No. 343,910.

My invention relates to sleeve valve mechanisms for gas combustion engines generally used in automobiles and other motor driven vehicles. It has for its object first, to provide within the cylinder of a gas combustion engine a reciprocating sleeve valve wherein are ports for gas intake and for exhaust outlet, these ports being so adjusted and timed as to register with and operate through corresponding fixed ports in the walls of the cylinder of the engine in perfect order for the operation of the engine; and second, to provide positive and noiseless valves for gas combustion engines without the use of spring actuated mechanism; and third, to improve and simplify the improvement in reciprocating sleeve valves for which I have made application for a patent filed December 17, 1928, Serial Number 326,574, by doing away with the bevel gear operative mechanism and operate the sleeve valve by a directly applied crank reciprocating movement.

I attain these objects by the mechanism illustrated in the accompanying drawing, in which—

Figures 1, 2:
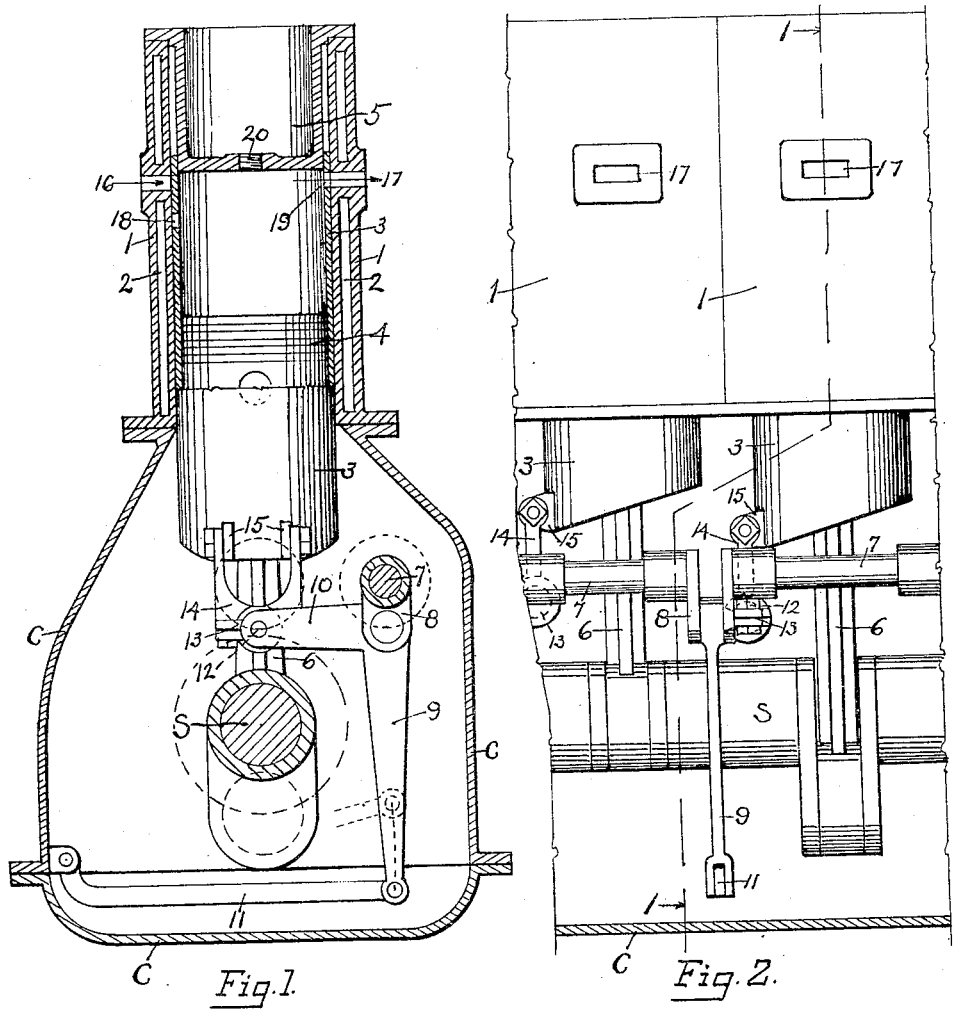
Figure 3:
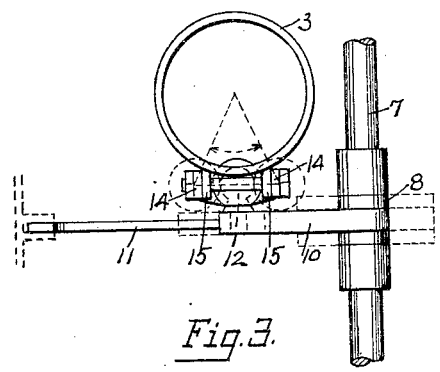

Fig. 1 is a vertical cross section of a gas engine on the line 1—1 of Figure 2, and shows a side view of my improved valve operating mechanism; Fig. 2 is a side view of a pair of engines with the side of the crank case removed to expose a view of the sleeve valve operating mechanism from the right side of Fig. 1; and Fig. 3 is a top view of the detached reciprocating sleeve valve with the crank mechanism attached and its operation indicated.

Similar characters refer to similar parts in the several views.

Referring to the drawing, Fig. 1 will be seen to represent a vertical section through a common form of gas combustion engine, the cylinder body being indicated by 1 with the space 2 for the usual water cooling circulation. My valve improvement comprises the inner cylindrical sleeve 3 and the direct and simple means for operating the same as hereinafter described. The sleeve 3 is smoothly milled on the outer side to neatly fit within the cylinder 1, and is milled on the inner side to allow the engine piston 4 to neatly fit and reciprocate therein. The cylinder head 5 is designed to extend down into the cylinder body and within the upper end of the cylindrical sleeve valve 3 and smoothly milled to fit therein. It will be seen that a space is thus provided for the one sleeve cylindrical valve to reciprocate freely between the cylinder body and its downwardly extended head. The piston rod 6 connects the piston 4 with the crank shaft S, common to all engines.

The single sleeve valve 3 is operated by shaft 7 mounted parallel with the crank shaft S and driven therefrom by chain belt or otherwise after the method of other engine valve operating mechanisms. On this shaft 7 is fixed a crank 8, there being one crank for each engine in the motor. Each crank is designed to carry an L-shaped operative arm, or elbow lever, composed of a pendent part 9 and a horizontal working arm 10. The lower end of the pendent part 9 is pivotally attached to a stay arm 11 mounted to swing vertically by having its other end pivotally attached to the crank case C. This arm 11 so stays the pendent arm 9 that it will reciprocate in practically a vertical line as indicated by the broken line. On the end of the horizontal arm 10 is fixed a ball knob 12 designed to engage a split socket 13 on which is fixed a yokelike extension 14. This yokelike extension has its upwardly extended ends pivotally attached to a pair of lugs 15 fixed on and extending from the lower end of the cylindrical valve sleeve 3.

It will now be perceived that when the engine is in motion, the crank 8 will cause the upper end of the L-shaped arm to rotate in a plane circle and the end of the horizontal arm 10 will rotate in the same vertical plane and carry the ball knob 12 and its split socket 13 with it. The yokelike extension 14 borne on the pivotally mounted socket 13 and having its upwardly extended ends pivotally attached to the lugs 15, will cause the cylindrical sleeve valve to reciprocate up and down and at the same time to rotate from side to side with a segmental oscillation, the latter movement being indicated in Fig. 3. The pivotal bearings of the yokelike member 14 will allow it to conform with the oscillating movement of the cylindrical sleeve 3. By this mechanical means the cylindrical sleeve valve will be operated with perfect precision and regularity.

It will now be perceived that my improvement will work noiselessly and with positive action with no spring actuated mechanism being required. The bevel gears of my former application referred to will be dispensed with. The entire operative mechanism can be confined within the crank case C and every bearing can thus be constantly lubricated. The operative parts are so located between the several engines of the motor as to not interfere with the operative parts of the engines. No effort has been made to show the construction of the fixed bearings, but to simply set forth the parts of my improvement and their operation.

The cylinder 1 is made with the gas intake port 16 and a discharge port 17 common to all gas explosive engines. The cylindrical sleeve valve is likewise provided with a gas intake port 18 and a discharge port 19. These ports are so positioned that they will register in alinement with their respective ports fixed in the cylinder body 1 in perfect timed relation for the perfect operation of the usual four-cycle gas combustion engine. It will be observed my invention is designed to be used in gas motors of two or more engines by extending the shaft 7 and adding the crank operating mechanism for each engine. The novelty lies in the L-shaped working arm, the ball knob fixed thereon, the split socket with the yokelike extension fixed thereon and its open ends pivotally attached to the lugs on the cylindrical sleeve valve which is thereby operated through its vertical reciprocation and its segmental oscillation.

It is to be observed that I do not limit the pivotal point of the stay arm 11 to the location shown, as it may be otherwise located. By this means the reciprocating movement of the cylindrical sleeve valve can be varied as the manufacturer may desire.

It will be seen that the threaded opening 20 in the cylinder head 5 provides for the usual spark plug attachment.

I am aware that various forms of cylindrical sleeve valves are now used, but none of them have the simplicity of mechanism, the positive and effective reciprocating and segmental oscillating motion combined as is attained by my improvement.

I therefore claim—

1. In an internal combustion engine the combination with an engine cylinder formed with inlet and exhaust ports; of a sleeve valve formed with inlet and exhaust ports for registration with the ports in the cylinder, a driven crank shaft, an elbow lever having a long and a short arm connected at the elbow with the crank of the driven shaft, a yoke having a ball and socket coupling to the short arm of the elbow lever and a pivotal connection to the sleeve valve, and a member pivotally connected to the long arm of the elbow lever and also to a support to direct the long arm of the lever in a substantially vertical line in its movements, said parts cooperating to impart a reciprocatory and an oscillatory movement to the sleeve valve.

2. In an internal combustion engine, a cylinder ported for intake and exhaust, a piston reciprocable within the cylinder, an engine crank-shaft driven from the piston, a sleeve-valve co-axial with the cylinder and ported for cooperation with the cylinder ports, a valve shaft, a rocking arm actuated from the valve shaft, and a yoke connecting the rocking arm and the sleeve-valve, the arms of the yoke having a hinged connection with the lower part of the sleeve-valve and the yoke also having a universal coupling to the rocking arm, said parts cooperating to impart a combined reciprocating oscillatory movement to the sleeve-valve derived from the engine crank shaft.

OLE O. STORLE.